(12) United States Patent
Yatsu et al.

(10) Patent No.: US 10,545,334 B2
(45) Date of Patent: Jan. 28, 2020

(54) FLARE-CUT MEMBER, LENS DEVICE, AND OPTICAL DEVICE

(71) Applicant: MAXELL, LTD., Kyoto (JP)

(72) Inventors: Masahiko Yatsu, Ibaraki (JP); Shuji Kato, Ibaraki (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 15/520,080

(22) PCT Filed: Jan. 28, 2015

(86) PCT No.: PCT/JP2015/052373
§ 371 (c)(1),
(2) Date: Apr. 19, 2017

(87) PCT Pub. No.: WO2016/121033
PCT Pub. Date: Aug. 4, 2016

(65) Prior Publication Data
US 2017/0307878 A1    Oct. 26, 2017

(51) Int. Cl.
| G02B 27/00 | (2006.01) |
| G02B 5/00  | (2006.01) |
| G02B 7/02  | (2006.01) |

(52) U.S. Cl.
CPC ......... *G02B 27/0018* (2013.01); *G02B 5/003* (2013.01); *G02B 7/021* (2013.01)

(58) Field of Classification Search
CPC ..... G02B 27/0018; G02B 5/003; G02B 7/021
USPC ........................................................ 359/614
See application file for complete search history.

(56) References Cited

U.S. PATENT DOCUMENTS

| 5,842,055 A * | 11/1998 | Tamura ................. G02B 5/005 359/676 |
| 8,325,267 B2 | 12/2012 | Momoki |
| 2006/0051085 A1 | 3/2006 | Okumura |
| 2009/0185065 A1* | 7/2009 | Ohno ..................... G02B 5/005 348/337 |
| 2011/0080649 A1* | 4/2011 | Kanbayashi .......... G02B 13/18 359/682 |

(Continued)

FOREIGN PATENT DOCUMENTS

| JP | 07-261106 A | 10/1995 |
| JP | 07-311359 A | 11/1995 |

(Continued)

OTHER PUBLICATIONS

International Search Report of PCT/JP2015/052373 dated Mar. 10, 2015.

(Continued)

*Primary Examiner* — Evan P Dzierzynski
*Assistant Examiner* — Mitchell T Oestreich
(74) *Attorney, Agent, or Firm* — Mattingly & Malur, PC

(57) ABSTRACT

The purpose of the present invention is to provide an optical device capable of rotationally adjusting a lens system with a flare-cut member incorporated therein. For this purpose, the flare-cut member according to the present invention is characterized by including a light shield surface for shielding the light flux incident on the periphery of a lens, and an opening formed in the light shield surface and causing the light flux incident on a lens element to pass therethrough, wherein the opening is formed in a rotationally symmetrical shape.

15 Claims, 11 Drawing Sheets

(56) References Cited

U.S. PATENT DOCUMENTS

2011/0091198 A1* 4/2011 Hasegawa ................ G03B 9/02
396/505

FOREIGN PATENT DOCUMENTS

| JP | 10-10396 A | 1/1998 |
| JP | 2002-40310 A | 2/2002 |
| JP | 2006-72151 A | 3/2006 |
| JP | 2010-186120 A | 8/2010 |

OTHER PUBLICATIONS

Japanese Office Action received in corresponding Japanese Application No. 2016-571579 dated Jan. 31, 2018.
Chinese Office Action received in corresponding Chinese Application No. 201580061498.5 dated Jul. 18, 2019.

* cited by examiner

FLARE-CUT MEMBER, LENS DEVICE, AND OPTICAL DEVICE

TECHNICAL FIELD

The present invention relates to a lens device and an optical device having a flare-cut member.

BACKGROUND ART

In recent years, high optical performance and also miniaturization and weight reduction of optical systems are demanded also in optical systems such as lenses for digital cameras and optical systems such as projection devices. Thus, lenses with a large aperture and lens balls having a lens surface of a small radius of curvature are increasingly used.

If such a lens ball is used for optical systems, a light beam is incident at a large angle on the periphery of the lens ball. Thus, because the angle of incidence covers a wide range, an antireflection coating in which a dielectric multilayer film is stacked as a single layer or multiple layers cannot sufficiently inhibit reflection, causing harmful light such as ghosts and flares.

To reduce harmful light generated at the periphery of a lens ball, optical systems in which a flare cut is arranged have been known. For example, Example 2 of Patent Literature 1 discloses a flare cut that allows a light flux that forms an image at the image height corresponding to an imaging range to pass through and blocks other light fluxes.

CITATION LIST

Patent Literature

PATENT LITERATURE 1: Specification excerpts from U.S. Pat. No. 8,325,267

SUMMARY OF INVENTION

Technical Problem

In optical systems in which many lens balls of a large aperture or of a small radius of curvature are used, the amount of eccentricity/inclination of each lens ball is required to be a smaller value. The amount of eccentricity/inclination of each lens ball is desirably equal to a target value or less, but depending on the direction in which an amount of eccentricity/inclination of a whole assembled lens arises, good resolution performance may be obtained.

In the relation between an imaging lens and an image sensor, for example, the degradation of resolution performance increases if the direction of eccentricity/inclination of each lens ball constituting the imaging lens is parallel to the long side of a rectangular effective range of the image sensor and on the other hand, the degradation of resolution performance decreases if the direction of eccentricity/inclination of each lens ball constituting the imaging lens is parallel to the short side of the rectangular effective range of the image sensor. The reason therefor is that even if the amount of eccentricity/inclination is the same, the image height is larger in the long side direction than that in the short side direction and thus, the influence of eccentricity/inclination is larger in the long side direction.

Here, in Patent Literature 1, a flare cut has an aperture formed in a rectangular shape and is arranged in an optical system and thus, if an assembled lens in which a flare cut is arranged is rotated, the position where a light flux having passed through the aperture of the flare cut is incident on the image sensor changes and the light flux is not necessarily incident on the effective range of the image sensor. Therefore, a problem of being unable to adjust eccentricity/inclination by rotating the assembled lens is posed. Strictly speaking, the rotational adjustments of 180 degrees can be made, but the relation between the image sensor and the effective range does not change, which practically means no rotational adjustments.

The present invention is made in view of the above problem and an object thereof is to provide a technology capable of rotationally adjusting even an assembled lens with a flare cut arranged therein.

Solution to Problem

To solve the above problem, a flare-cut member including a light shield surface that shields incidence of a light flux on periphery of a lens and an aperture in a rotational symmetrical shape formed in the light shield surface and through which the light flux incident on a lens ball passes is arranged on a light flux incident side of the lens ball constituting an assembled lens of an optical device.

Advantageous Effects of Invention

According to the present invention, a technology capable of rotationally adjusting even an assembled lens with a flare cut arranged therein can be provided. Other problems than the above problem, the configuration, and effects will be apparent from the description that follows.

DESCRIPTION OF EMBODIMENTS

Hereinafter, examples of the present invention will be described using the drawings. In each diagram, the same

First Embodiment

Figure 1:
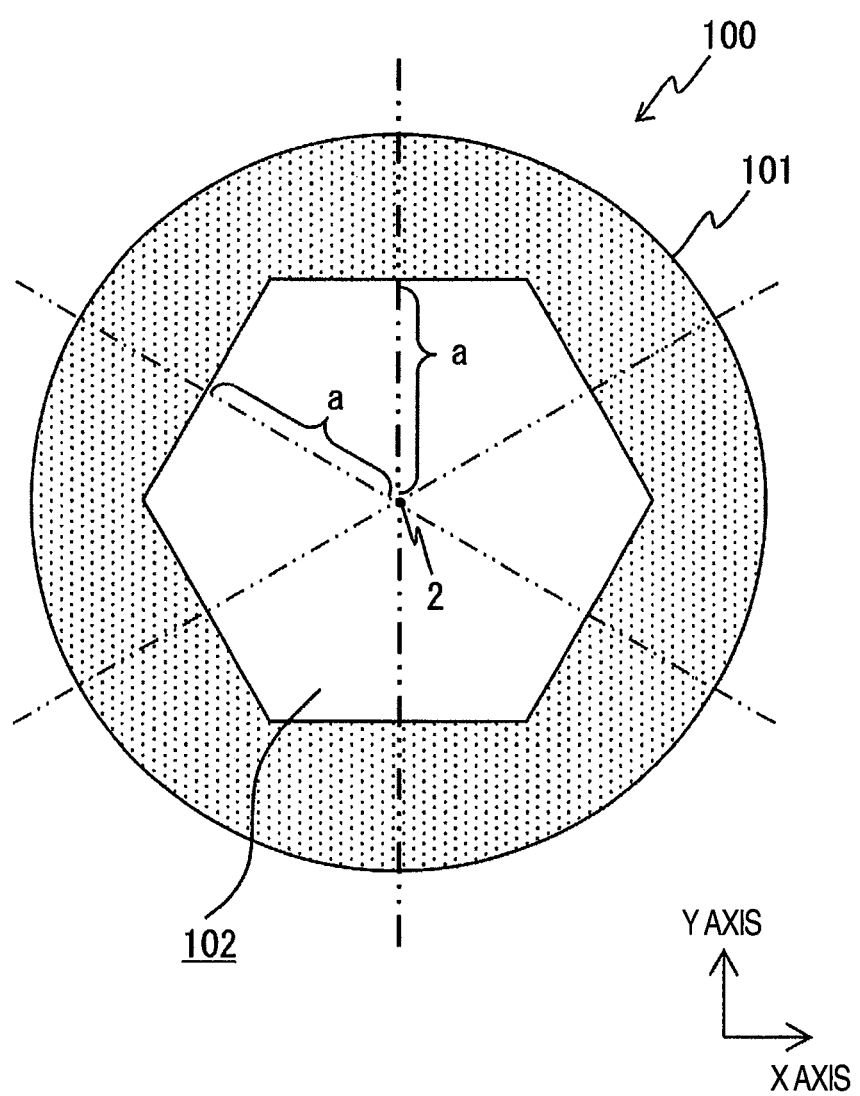
FIG. 1 is a schematic diagram of a flare cut according to a first embodiment.
Figure 2:
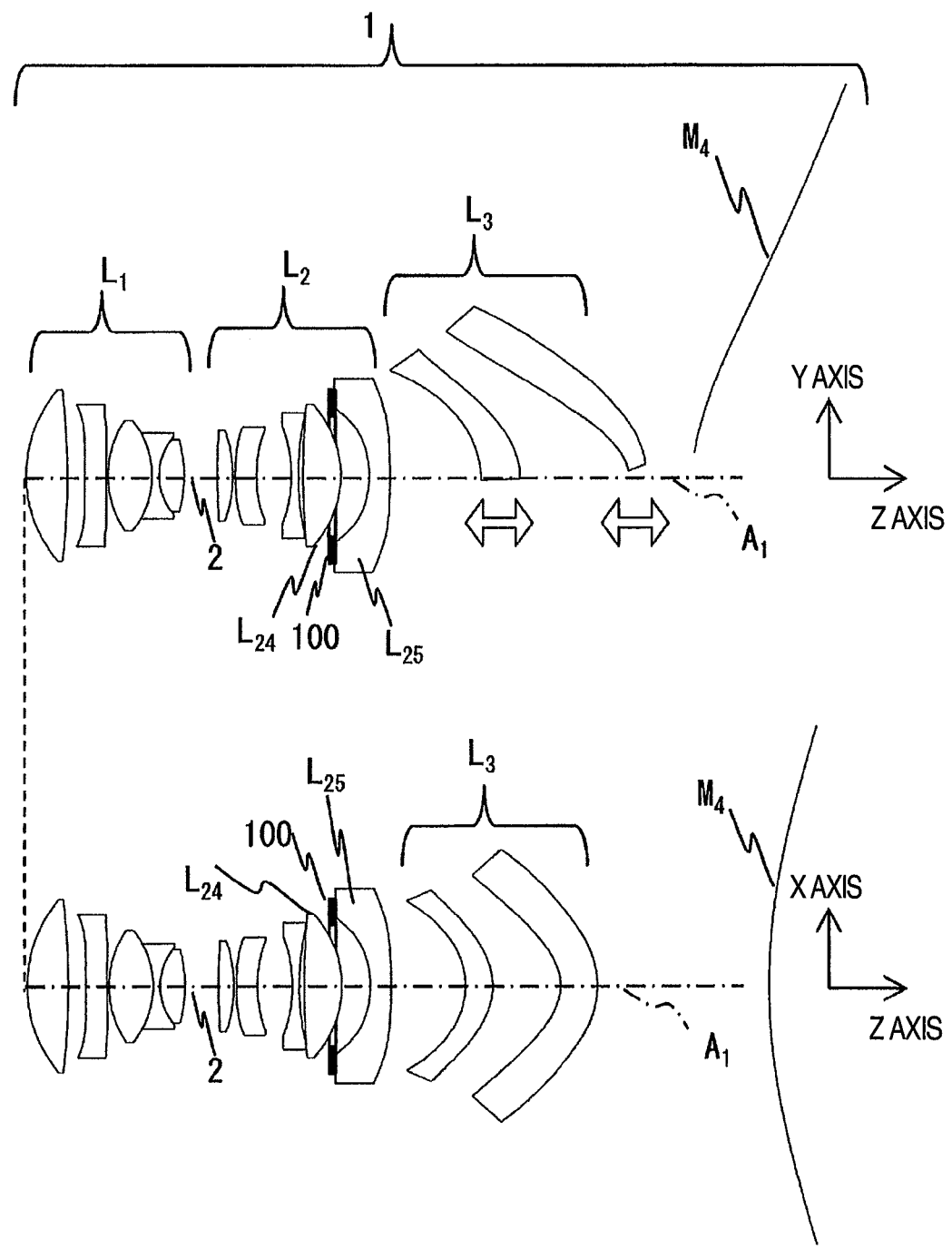
FIG. 2 is schematic diagram of a projective optical system 1 into which the flare cut of FIG. 1 is incorporated.
Figure 3:
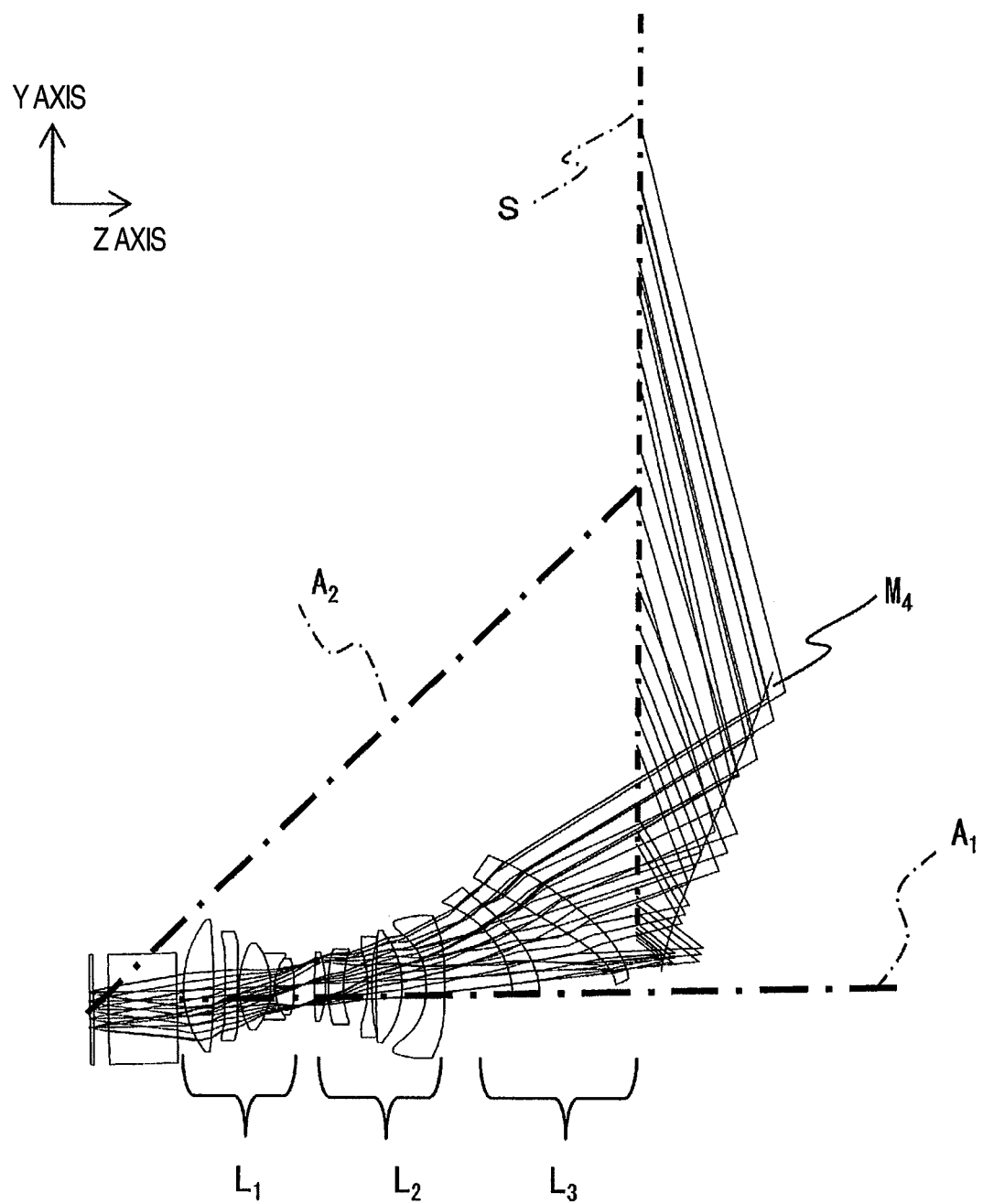
FIG. 3 is a diagram showing an optical path of a light flux passing through the projective optical system 1 in a YZ plane.

The first embodiment is an embodiment related to a flare-cut member adopting a hexagonal shape as an example of rotational symmetrical polygonal shapes. First, a flare cut according to the first embodiment and the configuration of a projective optical system incorporating the flare cut will be described with reference to FIGS. 1 to 3. FIG. 1 is a schematic diagram of a flare cut 100 according to the first embodiment and FIG. 2 is a schematic diagram of a projective optical system 1 into which the flare cut 100 of FIG. 1 is incorporated. FIG. 3 is a diagram showing an optical path of a light flux passing through the projective optical system 1 in a YZ plane.

As shown in FIG. 1, the flare-cut member 100 (hereinafter, abbreviated as the "flare cut") is made of a circular plate member and includes a light shield surface 101 that shields harmful light and an aperture 102 provided in a substantial center thereof. In the flare cut 100 according to the first embodiment, the aperture 102 has a regular hexagonal shape as an example of rotational symmetrical shapes.

The projective optical system 1 shown in FIG. 2 is a lens device of magnifying optical system having a lens configuration allowing an oblique projection onto the YZ plane and configured to arrange in the order of a first coaxial lens system $L_1$ and a second coaxial lens $L_2$ that are rotationally symmetrical, a rotational asymmetrical lens $L_3$, and a rotational asymmetrical mirror $M_4$ from the reduction side (light flux incident side).

The projective optical system 1 is configured to arrange the first coaxial lens system $L_1$ and the second coaxial lens $L_2$ on the same optical axis in the YZ plane and arrange the rotational asymmetrical lens $L_3$, and the rotational asymmetrical mirror $M_4$ above an optical axis $A_1$ of the first coaxial lens system $L_1$ and the second coaxial lens $L_2$ in the Y axis direction. Thus, as shown in FIG. 3, the light flux passes through substantially upper half locations, instead of the second coaxial lens system $L_2$ as a whole, in the YZ plane.

As shown in FIG. 3, the first coaxial lens system $L_1$ and the second coaxial lens $L_2$ have the optical axis $A_1$ common to both and the optical axis $A_1$ is different from a straight line $A_2$ connecting the center of an object and the center of a virtual image surface S. In FIG. 3, if a light beam chart up to an actual image surface (not shown) is depicted, the lens ball becomes too small and thus, the light reflected by the rotational asymmetrical mirror $M_4$ is partially depicted immediately after the reflection up to the virtual image surface S. From FIG. 3, it is clear that the optical axis $A_1$ and the straight line connecting the center of an object and the center of the actual image surface (not shown) are different.

In the first coaxial lens system $L_1$ that is rotationally symmetrical, flange back adjustments that make movement adjustments in the optical axis direction are made. Flange back adjustments are back focal distance adjustments in a lens assembly stage of manufacturing and the method of replacing the spacer is also known, but in general, from ease of work, a screw of helicoid is provided between an inner lens-barrel of the lens-barrel holding the first coaxial lens system $L_1$ and an outer lens-barrel housing the inner lens-barrel and the first coaxial lens system $L_1$ is moved in the optical axis direction. In the flange back adjustments, therefore, the first coaxial lens system $L_1$ rotates around the optical axis $A_1$. On the other hand, the second coaxial lens system $L_2$ is not moved by helicoid adjustments and does not rotate around the optical axis $A_1$. The rotational asymmetrical lens $L_3$ exerts a focusing action by moving each lens ball in the optical axis direction. The rotational asymmetrical mirror $M_4$ does not move during focusing action of the rotational asymmetrical lens $L_3$. The rotational asymmetrical lens $L_3$ and the rotational asymmetrical mirror $M_4$ correct trapezoidal distortion mainly caused by oblique projections.

The flare cut 100 is arranged between a lens $L_{24}$ and a lens $L_{25}$ in the second coaxial lens system $L_2$ (see FIG. 2). The reason for arranging the flare cut 100 in the projective optical system 1 is as follows:

Light fluxes emitted from different positions of object points overlap in an optical system and are separated more as the image surface side is approached before being condensed in respective corresponding positions on the image surface side. Here, if a flare cut is arranged immediately before the image surface, only light fluxes at the periphery of an image are shielded and thus, a relative illumination with respect to the image height rapidly decreases at the maximum image height. Even if brightness at the periphery with respect to brightness in the center of the image surface satisfies the target value, an image of low quality in which darkness at the periphery is conspicuous is obtained if the light quantity decreases rapidly at the periphery.

Thus, in the present embodiment, by arranging the flare cut 100 on the reduction side (light flux incident side) of the lens ball $L_{25}$ constituting the second coaxial lens L2, rapid deterioration of the relative illumination is prevented. Hereinafter, the action of the flare cut 100 will be described using FIGS. 4 and 5.

Figure 4:
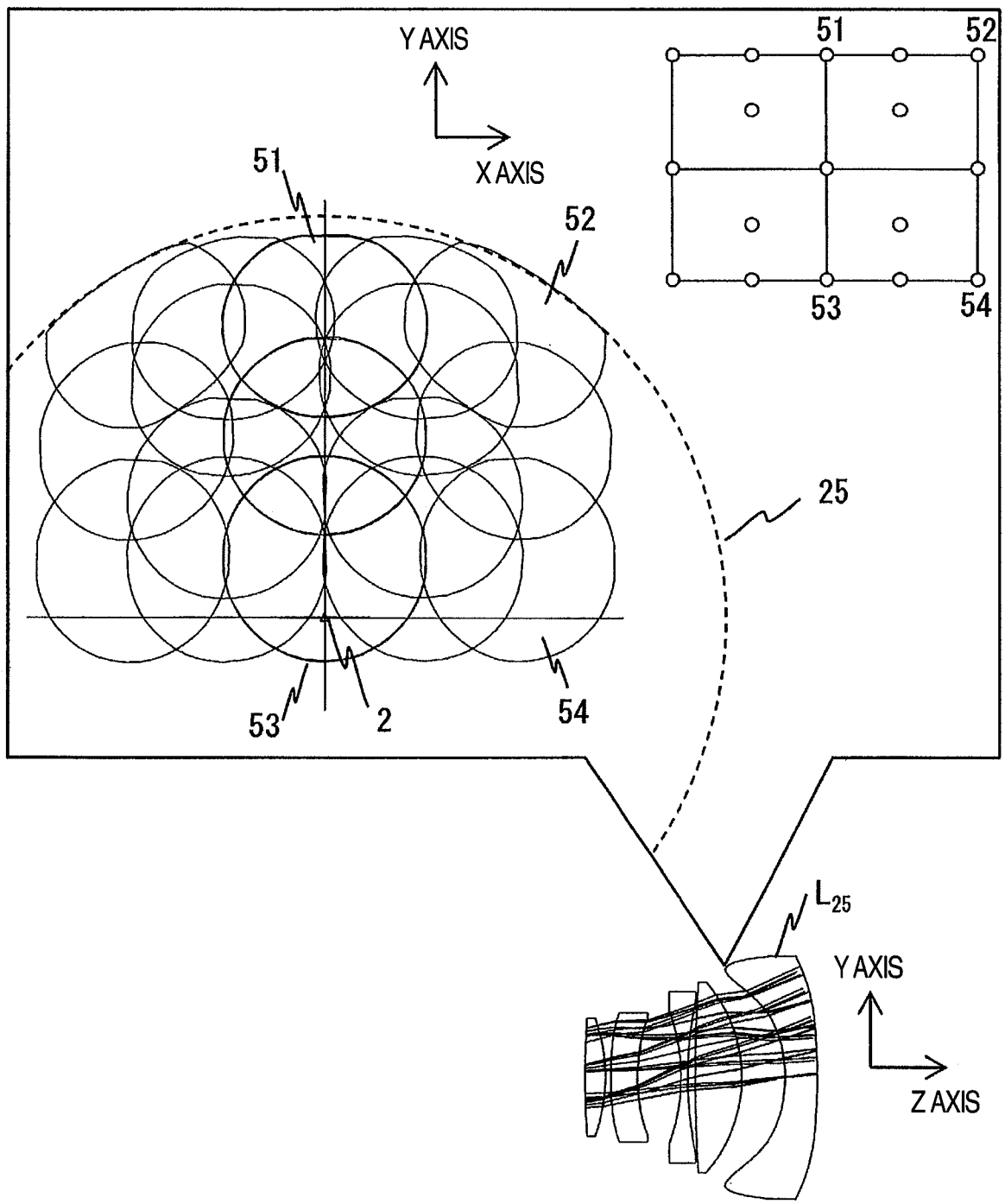
FIG. 4 is a diagram representing a light flux range before the flare cut is incorporated.

FIG. 4 is a diagram representing each light flux range in the plane of incidence of the lens $L_{25}$ of a light flux reaching an image point 17 location in a rectangular region on the image surface when the flare cut 100 is not used. The same reference signs are attached to, among light fluxes, light fluxes corresponding to image points 51, 52, 53, 54 on the image surface of FIG. 4. A dotted line 25 in an arc shape in FIG. 4 corresponds to an effective diameter in the plane of incidence of the lens $L_{25}$ and it is clear that in the effective range on the surface, a portion of the light flux of the image point 52 at the upper edge of the image surface is shielded.

If the effective diameter on the surface is made smaller, only the light flux of the image point 52 is shielded and if the effective diameter on the surface is made still smaller, light fluxes of the image points 51, 52 are shielded. That is, the light flux of the image point 52 is significantly shielded before the light flux of the image point 51 is shielded and the relative illumination becomes too small and the image point 52 becomes too dark.

Figure 5:
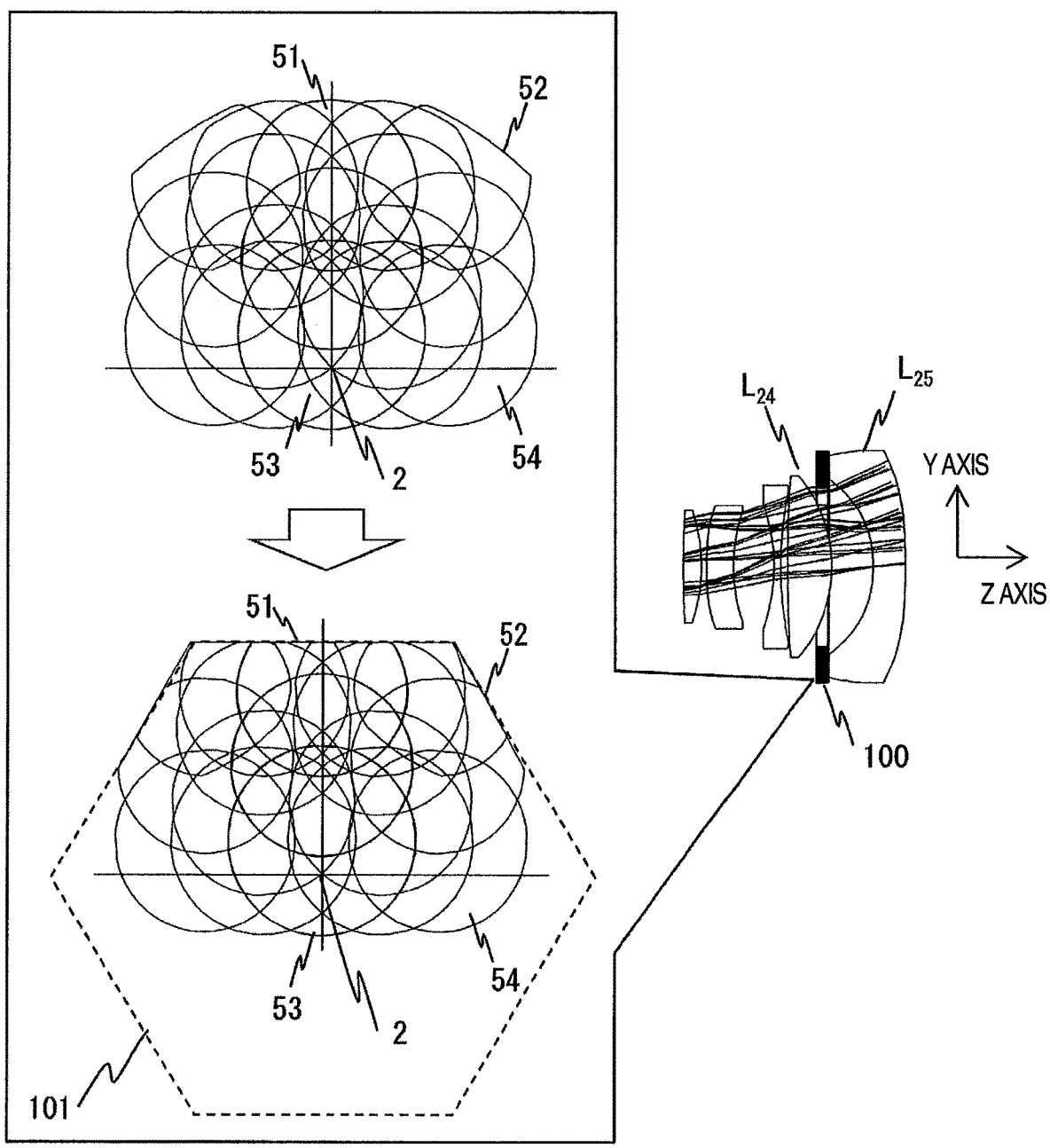
FIG. 5 is a diagram representing a light shield action of the light flux by the flare cut according to the first embodiment.

FIG. 5 is a diagram illustrating each light flux range in the plane in which the flare cut 100 is arranged between the lens $L_{24}$ and the lens $L_{25}$ in the second coaxial lens system $L_2$. Compared with the light flux range in the plane of incidence of the lens $L_{25}$ in FIG. 4 described above, the position of direction of an optical axis 2 with respect to light fluxes of particularly the image points 53, 54 is different and thus, how light fluxes overlap appears to be different, but regarding light fluxes of the image points 51, 52, the position of direction of the optical axis 2 is close to the plane of incidence of the lens $L_{25}$ and thus, the light flux range approximately the same as that in FIG. 4 is obtained.

By selecting a hexagonal shape as the shape of the aperture 102 (see FIG. 1) of the flare cut 100 in FIG. 4, while a light shield quantity at the image point 52 is suppressed, a flare of the light flux of the image point 51 can be cut at the same time.

Incidentally, the light flux of the image points 53, 54 is not shielded at all in FIG. 5 and so the hexagonal shape is not needed from this light shield relation. The reason for selecting a hexagonal shape as the shape of the aperture 102 of the flare cut 100 is to enable rotational adjustments by the coaxial lens system $L_2$ containing the flare cut 100 as a whole. Hereinafter, rotational adjustments will be described.

Originally, the second coaxial lens system $L_2$ should not be affected at all even if rotated around the optical axis 2 (see FIGS. 1 and 2). In actual assembled lenses, however, due to the relationship between the direction in which eccentricity or inclination occurs in the corporation of each lens ball and the passage range of light flux in FIG. 5 described above, more differences in optical performance of the projective optical system 1 as a whole arise when the second coaxial lens system $L_2$ is rotated around the optical axis 2. Therefore, the aperture 102 of the flare cut 100 is formed in a rotational symmetrical shape so that the light shield action of flare does not change even if rotational adjustments of the second coaxial lens system $L_2$ containing the flare cut 100 are made around the optical axis 2.

Further, by adopting the hexagonal shape as one of rotational symmetrical shapes, differences of peripheral light quantities between each image point (for example, the image points 51, 52) positioned near outer periphery of an image can be decreased so that the quantity of light in the periphery of an image can be made more uniform. Therefore, in the periphery of the same image in a rectangular shape, the difference between, for example, the quantity of light in the center of a side of the rectangular shape and that at a corner can be decreased.

Figure 6:
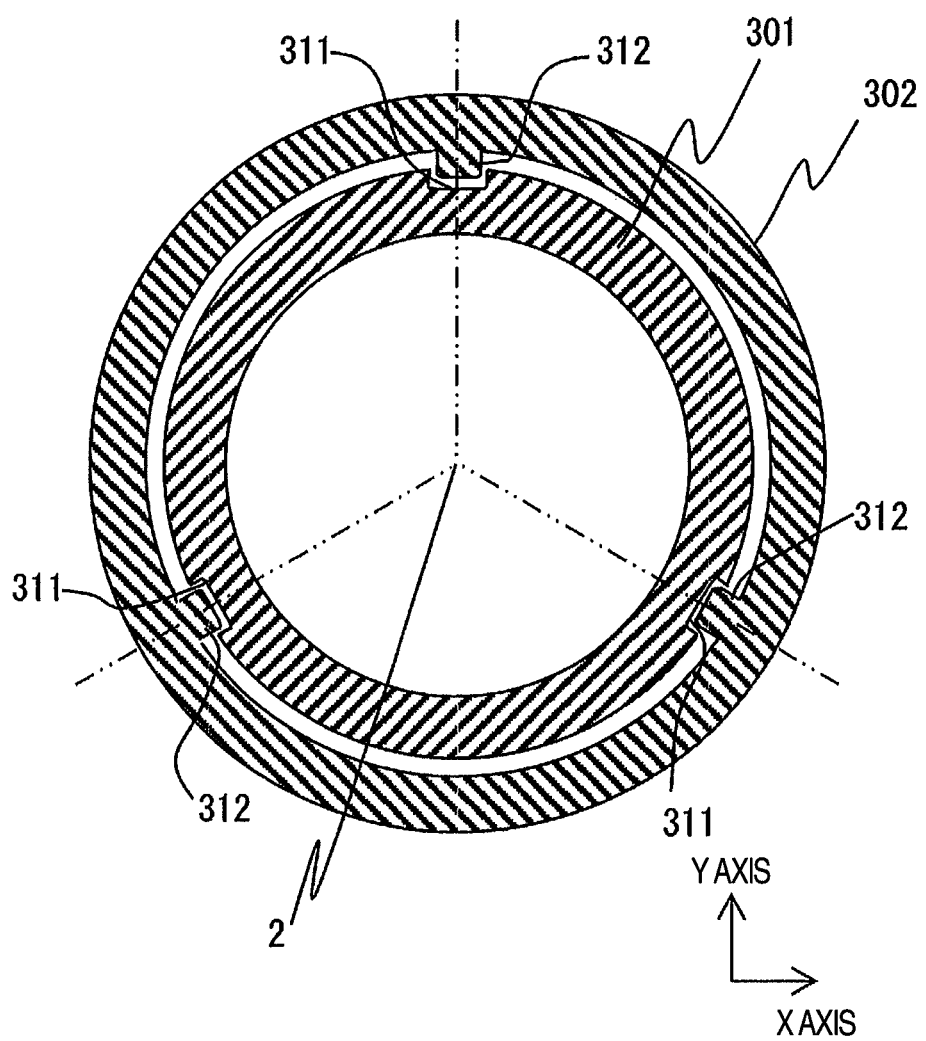
FIG. 6 is an explanatory view (XY sectional view) of rotational adjustments of an assembled lens into which the flare cut according to the first embodiment is incorporated.

FIG. 6 is an explanatory view of rotational adjustments of an assembled lens into which a flare cut is incorporated and a diagram showing the relationship between the flare cut 100 and an inner lens-barrel 301 containing the second coaxial lens system $L_2$ that is rotationally symmetrical, and an outer lens-barrel 302 arranged on the outer side thereof. In FIG. 6, the illustration of the second coaxial lens system $L_2$ is omitted, but the second coaxial lens system $L_2$ is held inside the inner lens-barrel 301.

A recess 311 is provided on an outer circumferential portion of the inner lens-barrel 301 in increments of 120 degrees. Also, a height 312 is provided on an inner circumferential portion of the outer lens-barrel 302 in increments of 120 degrees. The inner lens-barrel 301 is rotatably housed inside the outer lens-barrel 302 and the inner lens-barrel 301 and the outer lens-barrel 302 can be incorporated by shifting in increments of 120 degrees by fitting the height 312 into the recess 311. In this case, the flare cut 100 whose aperture 102 has a hexagonal shape can retain the light shield action of flare even if rotational adjustments around the optical axis 2 are made in increments of 120 degrees.

In the first embodiment, the shape of the light shield portion of the flare cut 100 is hexagonal and thus, the flare cut 100 still has rotational symmetry if rotated around the optical axis 2 in increments of 60 degrees. Therefore, if the inner lens-barrel 301 is structured to be able to change the angle with respect to the outer lens-barrel 302 in increments of 60 degrees, rotational adjustments in increments of 60 degrees can also be made.

The aperture 102 of the light shield surface 101 is set to have a regular hexagonal shape, but the effect of the present invention can naturally be achieved if an aperture shape in which vertex portions at corners are connected by a curve is adopted. Similarly, the shape of each side of the regular hexagon forming an aperture shape of the light shield surface may be a curve, instead of a straight line.

Second Embodiment

Figure 7:
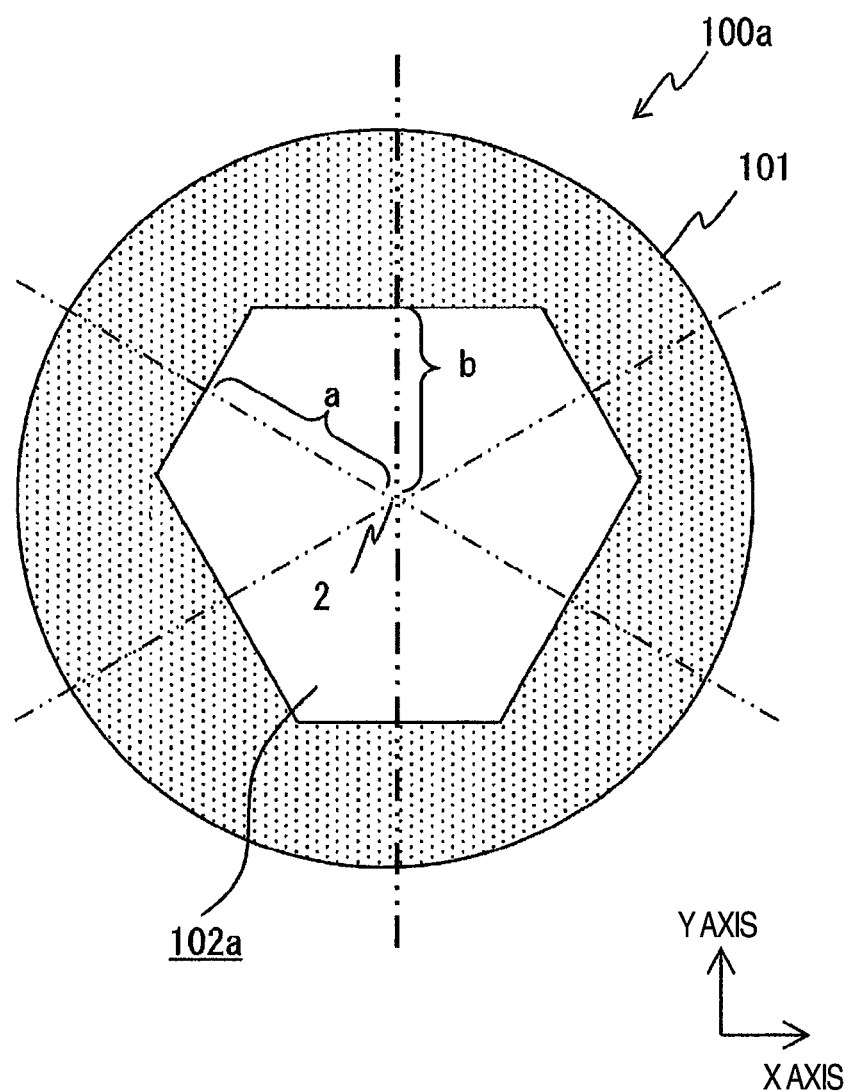
FIG. 7 is a schematic diagram of a flare cut according to a second embodiment.

The second embodiment is an embodiment in which the aperture shape of a flare cut is formed in a shape having rotational symmetry only at a certain angle around the optical axis. The second embodiment is different from the first embodiment only in flare cut and thus, only the function of the flare cut will be described while omitting other descriptions. Hereinafter, a flare cut 100a according to the second embodiment will be described using FIG. 7. FIG. 7 is a schematic diagram of the flare cut according to the second embodiment.

As shown in FIG. 7, an aperture 102a of the flare cut 100a according to the second embodiment has a hexagonal shape that is not a regular hexagonal shape. Two types of sides, a side whose distance from the aperture center (optical axis 2) of the hexagonal shape to the side is a relatively large value a and a side whose distance from the aperture center to the side is a relatively small value b and the side of the distance a and the side of the distance b are configured to be alternately adjacent to each other. Therefore, the flare cut 100a has a symmetrical shape if rotated around the optical axis 2 in increments of 120 degrees.

Therefore, like in the first embodiment, rotational adjustments of the second coaxial lens system $L_2$ containing the flare cut 100a can be made.

Incidentally, the flare cut 100a does not have rotational symmetry when the flare cut 100a is rotated in increments of 60 degrees. Therefore, the shape of the aperture 102a of the flare cut 100a is a shape having rotational symmetry only when rotated a certain angle, that is, 120 degrees around the optical axis.

The distance b is smaller than the distance a in the flare cut 100a and thus, the light flux of the image point 51 is significantly shielded while light shielding of the image point 52 in FIG. 5 remains the same.

By incorporating the flare cut 100a by shifting 60 degrees, conversely the light flux of the image point 52 can significantly be shielded while light shielding of the image point 51 remains the same.

Figure 8:
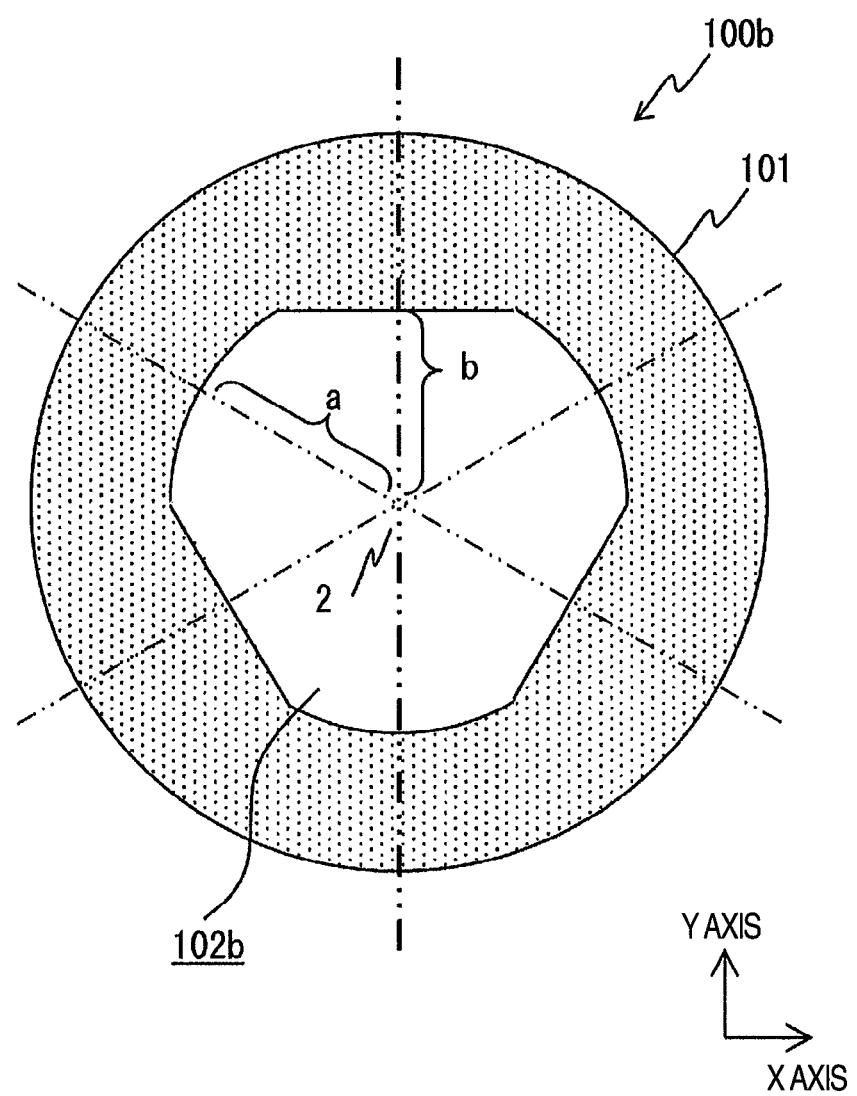
FIG. 8 is a schematic diagram of a flare cut according to a modification of the second embodiment.

Next, a modification of the second embodiment will be described using FIG. 8. FIG. 8 is a schematic diagram showing a modification of the flare cut according to the second embodiment. In the first embodiment described above, a description was provided that the shape of each side of a regular hexagon forming the shape of an aperture of the light shield surface may be a curve, instead of a straight line, and in a flare cut 100b in FIG. 8, the shape of an aperture 102b is formed by a side whose distance from the optical axis 2 to the side has a large value a and a side whose distance has a small value b being alternately arranged next to each other, with the side whose distance having the large value a forming a portion of an arc. The distance from the optical axis 2 has different values a, b and thus, the flare cut 100b can also shield a flare of the image point 51.

According to the present embodiment, by adopting the shape of an aperture of the flare cut having rotational symmetry before and after rotation of a portion of rotation angles around the optical axis (aperture center) and rotational asymmetry before and after rotation of remaining rotation angles, rotational adjustments can be made at a rotation angle having rotational symmetry when peripheral light quantities of an image should be made more uniform and at a rotation angle having rotational asymmetry when differences of peripheral light quantities should be provided. Particularly when left and right differences of eccentricity/inclination are large in an assembled lens, the latter rotational adjustments are effective.

Third Embodiment

Figure 9:
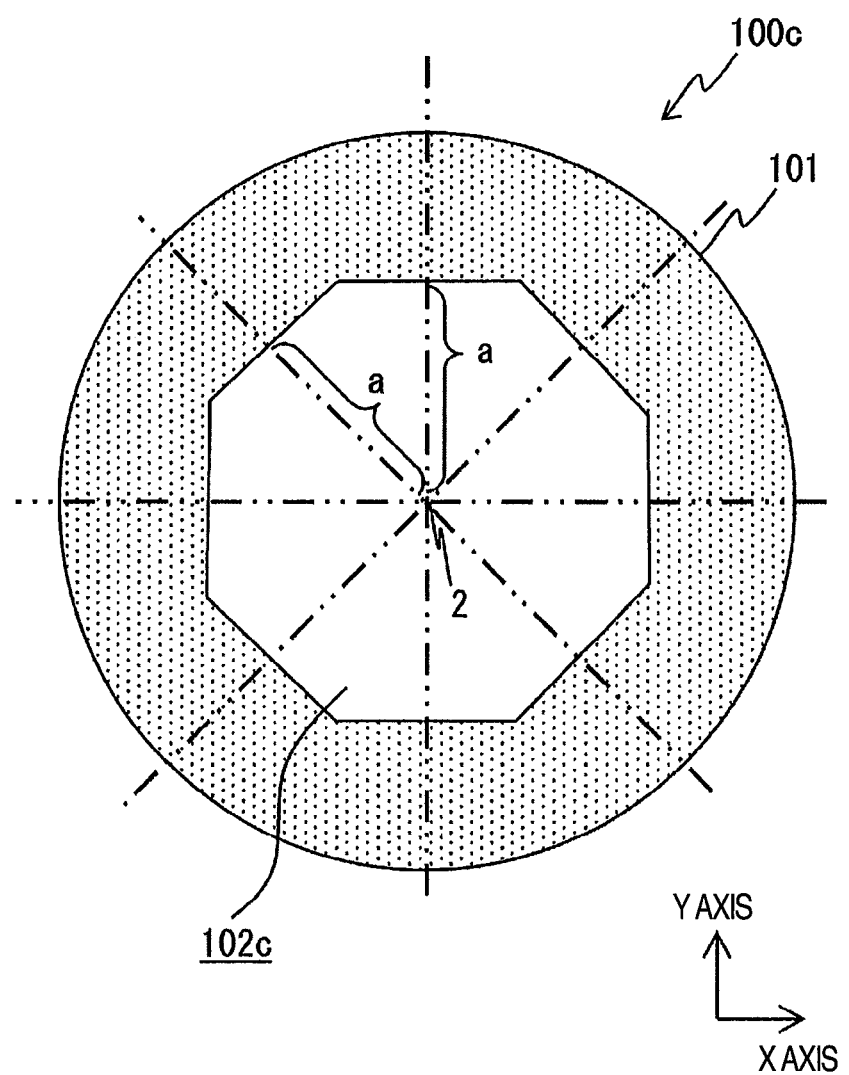
FIG. 9 is a schematic diagram of a flare cut according to a third embodiment.
Figure 10:
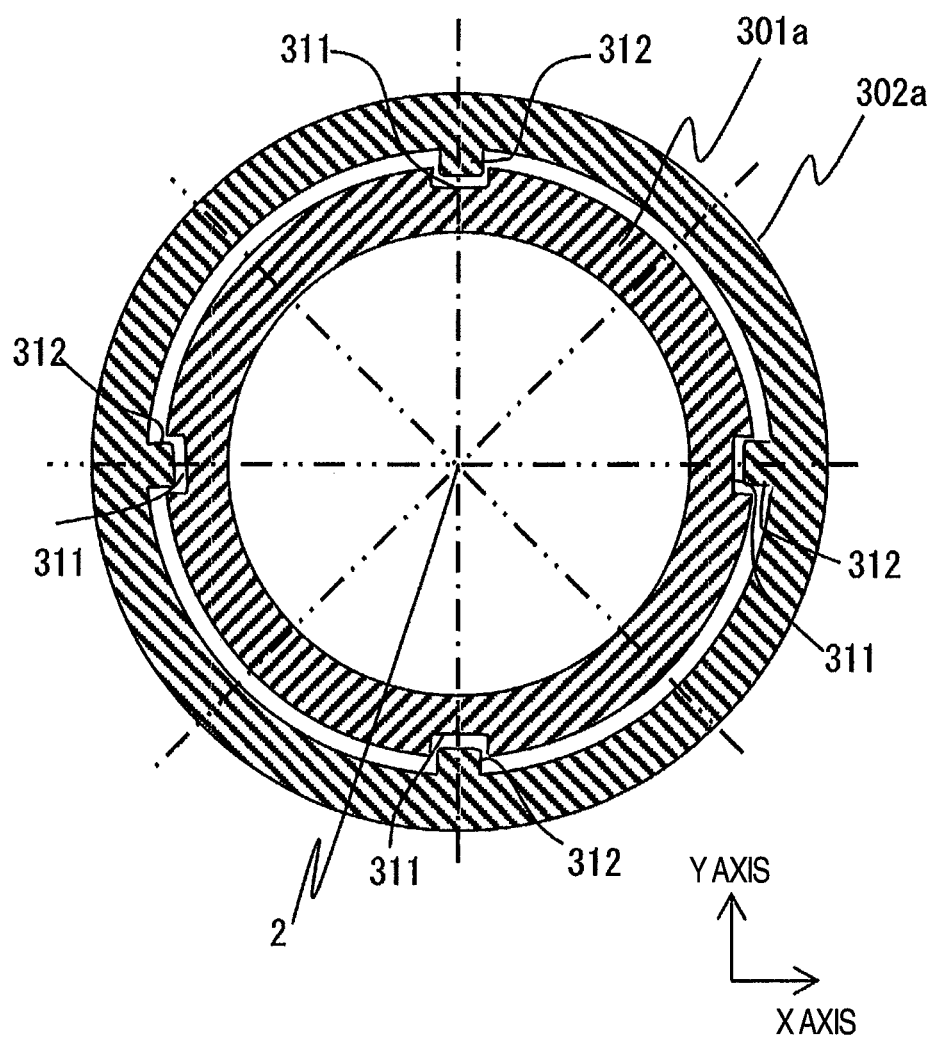
FIG. 10 is an explanatory view (XY sectional view) of rotational adjustments of the assembled lens into which the flare cut according to the third embodiment is incorporated.

The shape of an aperture of the flare cut may be a polygonal shape of pentagon or more having point symmetry and in the third embodiment, an octagonal shape is adopted as a shape having more sides than a hexagonal shape in the first and second embodiments. Hereinafter, the third embodiment will be described using FIGS. 9 and 10. FIG. 9 is a schematic diagram of a flare cut according to the third embodiment. FIG. 10 is an explanatory view of rotational adjustments of the assembled lens into which the flare cut according to the third embodiment is incorporated and a diagram representing the relationship between an inner lens-barrel containing a flare cut and the second coaxial lens system $L_2$ that are rotationally symmetrical and an outer lens-barrel. The present embodiment is different from the first embodiment only in the flare cut, the inner lens-barrel, and the outer lens-barrel and thus, only the function of the flare cut and the inner lens-barrel and the outer lens-barrel will be described, omitting other descriptions.

The shape of an aperture 102c of a flare cut 100c in FIG. 9 is a regular octagonal shape. The flare cut 100c has a symmetrical shape when rotated around the optical axis 2 in increments of 45 degrees.

Therefore, like in the first embodiment, rotational adjustments of the second coaxial lens system $L_2$ containing the flare cut 100c can be made.

Then, as shown in FIG. 10, an inner lens-barrel 301a containing the second optical axis lens system $L_2$ and an outer lens-barrel 302a are structured to be incorporated by rotating in increments of 90 degrees.

Four recesses 311 are provided on the outer circumferential portion of the inner lens-barrel 301a in increments of 90 degrees. On the inner circumferential portion of the outer lens-barrel 302a, on the other hand, four heights 312 are provided in increments of 90 degrees. Accordingly, the inner lens-barrel 301a and the outer lens-barrel 302a can be incorporated by shifting in increments of 90 degrees by fitting the heights 312 into the recesses 311. In this case, the shape of the aperture 102c of the flare cut 100c is octagonal and thus, the light shield action of flare can be retained even if rotational adjustments around the optical axis 2 are made in increments of 90 degrees.

According to the present embodiment, rotational symmetry of the flare cut can be guaranteed at still finer rotation angles than in the first and second embodiments and therefore, the precision of fine adjustments of eccentricity/inclination of the lens can further be improved.

Fourth Embodiment

Figure 11:
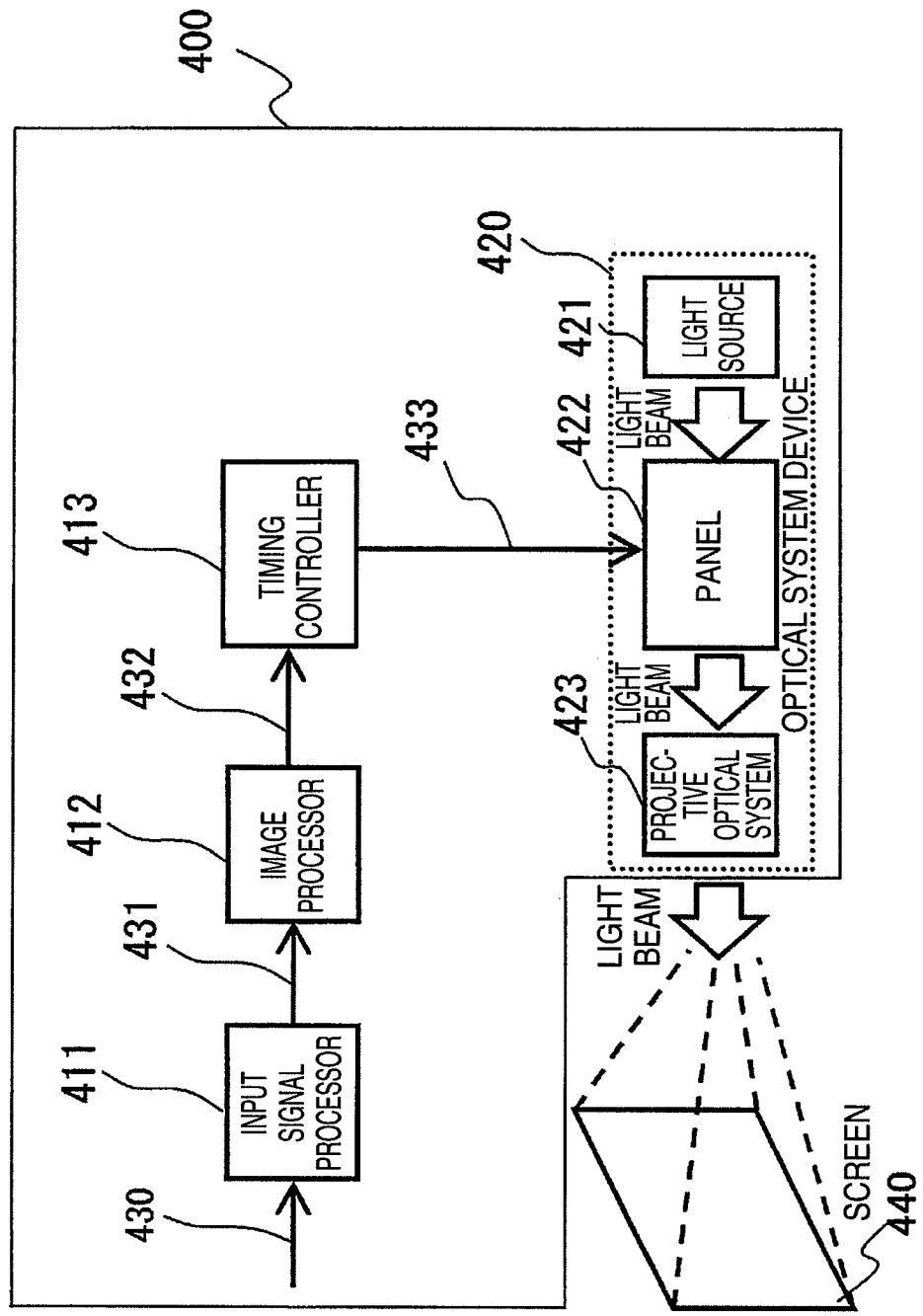
FIG. 11 is a schematic diagram of a front projector mounted with the projective optical system according to the above embodiments.

The above projective optical system can be applied to optical devices mounted with an assembled lens, for example, optical devices that make an enlarged projection such as front projectors and rear projection TVs. In the fourth embodiment, as an example thereof, a front projector using the flare cut will be described with reference to FIG. 11. FIG. 11 is a schematic diagram of a front projector mounted with the projective optical system according to the above embodiments.

A front projector 400 in FIG. 11 includes an input signal processor 411 that converts a video input signal 430 into an internal video signal 431 by, for example, the IP conversion, scaler or the like, an image processor 412 that makes, for example, key tone corrections or resolution corrections on the internal video signal 431 and outputs a corrected video signal 432, a timing controller 413 that generates a display control signal 433 by associating the corrected video signal 432 with a horizontal/vertical synchronization signal, and an optical system device 420 that displays video.

The optical system device 420 includes a light source 421 that emits a light beam to project video onto a screen 440, a panel 422 that receives the display control signal 433 as input and adjusts the gradation of the light beam from the light source 421 for each pixel to create projection video, and a projective optical system 423 containing a lens to make an enlarged projection of the projection video on the screen. The projective optical systems described in the first to third embodiments can be applied to the projective optical system 423.

Each of the above embodiments does not limit the present invention and modifications without deviating from the spirit of the present invention are included in the present invention. As an example of modifications, for example, the shape of an aperture of the flare-cut member may be formed into shapes different from the polygonal shapes described above like rotational symmetrical shapes, for example, a circular shape or shapes for which a plurality of angles at which rotational symmetry is displayed exists. If the rotation angle of the outer lens-barrel and inner lens-barrel of a lens device and the angle at which an aperture of the flare cut can maintain a rotational symmetrical shape match, the lens device may be formed adjustably by rotating the inner lens-barrel even at an angle different from the angle of the hexagonal shape or the octagonal shape.

REFERENCE SIGNS LIST

1 Projective optical system
2 Optical axis
$L_1$ First coaxial lens system that is rotationally symmetrical
$L_2$ Second coaxial lens system that is rotationally symmetrical
$L_3$ Rotational asymmetrical lens
$M_4$ Rotational asymmetrical mirror
51, 52, 53, 54 Light flux range corresponding to four locations on an image surface
100 Flare cut
101 Light shield surface
102 Aperture
301 Inner lens-barrel containing an assembled lens including a flare cut
302 Outer lens-barrel containing an assembled lens including a flare cut

The invention claimed is:
1. A flare-cut member contained in an inner-lens barrel, the inner-lens barrel being rotatably housed inside an outer lens-barrel and having a common axis with the outer lens-barrel, the flare-cut member comprising:
a light shield surface that shields a light flux incident on periphery of a lens; and
an aperture permanently formed in the light shield surface to have a fixed shape and through which the light flux incident on a lens passes,
wherein the shape of the aperture is a polygonal shape having at least five sides and which is rotationally symmetric and point symmetric, and wherein the flare-cut member is configured to enable rotational adjustments by being rotatable with the inner lens barrel so that a light shielding performed by the flare-cut member is maintained upon rotation of the flare-cut member with the inner lens barrel.

2. The flare-cut member according to claim 1, wherein the shape of the aperture is such that rotational symmetry exists at a plurality of angles.

3. The flare-cut member according to claim 1, wherein the shape of the aperture is a hexagonal shape.

4. The flare-cut member according to claim 1, wherein the shape of the aperture is an octagonal shape.

5. The flare-cut member according to claim 1, wherein the polygonal shape of the aperture is formed by a plurality of first sides and a plurality of second sides arranged in an alternating manner, wherein a distance from an aperture center of the aperture to each of the plurality of first sides has a first value and a distance from an aperture center of the aperture to each of the plurality of second sides has a second value, and wherein the first value is greater than the second value.

6. A lens device of a magnifying optical system comprising:
an outer lens-barrel;
an inner lens-barrel housed rotatably with respect to the outer lens-barrel inside the outer lens-barrel and having a common axis with the outer lens-barrel;
a plurality of rotational symmetrical lenses arranged on a coaxial optical axis inside the inner lens-barrel; and
a flare-cut member arranged on a light flux incident side of one lens of the plurality of lenses,
wherein the flare-cut member includes a light shield surface that shields a light flux incident on periphery of the one lens and an aperture permanently formed in the light shield surface to have a fixed shape and through which the light flux incident on the lenses passes,
wherein the shape of the aperture is a polygonal shape having at least five sides and which is rotationally symmetric and point symmetric, and
wherein the flare-cut member is configured to enable rotational adjustments by being rotatable with the inner lens barrel so that a light shielding performed by the flare-cut member is maintained upon rotation of the flare-cut member with the inner lens barrel.

7. An optical device comprising:
a plurality of lens devices of a magnifying optical system are arranged on an optical axis common to the plurality of lens devices, and the optical axis and a straight line connecting an object center and an image center are different,
wherein one of the plurality of coaxial lens devices includes:
an outer lens-barrel;
an inner lens-barrel housed rotatably with respect to the outer lens-barrel inside the outer lens-barrel and having a common axis with the outer lens-barrel;
a plurality of rotational symmetrical lenses arranged on a coaxial optical axis inside the inner lens-barrel; and
a flare-cut member arranged on a light flux incident side of one lens of the plurality of lenses,
the flare-cut member includes a light shield surface that shields a light flux incident on periphery of the one lens and an aperture permanently formed in the light shield surface to have a fixed shape and through which the light flux incident on the lens passes,
the shape of the aperture is a polygonal shape having at least five sides and which is rotationally symmetric and point symmetric, and
wherein the flare-cut member is configured to enable rotational adjustments by being rotatable with the inner lens barrel so that a light shielding performed by the flare-cut member is maintained upon rotation of the flare-cut member with the inner lens barrel.

8. The lens device according to claim 6, wherein the shape of the aperture is such that rotational symmetry exists at a plurality of angles.

9. The lens device according to claim 6, wherein the shape of the aperture is a hexagonal shape.

10. The lens device according to claim 6, wherein the shape of the aperture is an octagonal shape.

11. The lens device according to claim 6, wherein the polygonal shape of the aperture is formed by a plurality of first sides and a plurality of second sides arranged in an alternating manner, wherein a distance from an aperture center of the aperture to each of the plurality of first sides has a first value and a distance from an aperture center of the aperture to each of the plurality of second sides has a second value, and wherein the first value is greater than the second value.

12. The optical device according to claim 7, wherein the shape of the aperture is such that rotational symmetry exists at a plurality of angles.

13. The optical device according to claim 7, wherein the shape of the aperture is a hexagonal shape.

14. The optical device according to claim 7, wherein the shape of the aperture is an octagonal shape.

15. The optical device according to claim 7, wherein the polygonal shape of the aperture is formed by a plurality of first sides and a plurality of second sides arranged in an alternating manner, wherein a distance from an aperture center of the aperture to each of the plurality of first sides has a first value and a distance from an aperture center of the aperture to each of the plurality of second sides has a second value, and wherein the first value is greater than the second value.

* * * * *